(12) United States Patent
He et al.

(10) Patent No.: US 10,572,079 B2
(45) Date of Patent: Feb. 25, 2020

(54) TOUCH SUBSTRATE, FABRICATING METHOD THEREOF, DISPLAY PANEL AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Min He, Beijing (CN); Xiaodong Xie, Beijing (CN); Jing Wang, Beijing (CN); Jian Tian, Beijing (CN)

(73) Assignees: BOE TECHNOLOGY GROUP CO., LTD., Beijing (CN); HEFEI XINSHENG OPTOELECTRONICS TECHNOLOGY CO., LTD., Beijing (CN)

( * ) Notice: Subject to any disclaimer, the term of this patent is extended or adjusted under 35 U.S.C. 154(b) by 28 days.

(21) Appl. No.: 15/554,788

(22) PCT Filed: Feb. 15, 2017

(86) PCT No.: PCT/CN2017/073543
§ 371 (c)(1),
(2) Date: Aug. 31, 2017

(87) PCT Pub. No.: WO2018/028161
PCT Pub. Date: Feb. 15, 2018

(65) Prior Publication Data
US 2018/0239457 A1    Aug. 23, 2018

(30) Foreign Application Priority Data
Aug. 12, 2016   (CN) .......................... 2016 1 0660049

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 2203/04103* (2013.01)

(58) Field of Classification Search
CPC .... G06F 3/044; H03K 17/962; H03K 17/955; H03K 17/9645; G01D 5/24
See application file for complete search history.

(56) References Cited

U.S. PATENT DOCUMENTS 8,247,712 B2 * 8/2012 Yoshikawa ............. G06F 3/044
178/18.06
9,244,575 B2 * 1/2016 Agari ...................... G06F 3/044
(Continued)

FOREIGN PATENT DOCUMENTS

CN        101694605 A    4/2010
CN        101739187 A    6/2010
(Continued)

OTHER PUBLICATIONS

Search Report for International Patent Application No. PCT/CN2017/073543 dated Apr. 27, 2017.
(Continued)

*Primary Examiner* — William Lu
(74) *Attorney, Agent, or Firm* — Calfee, Halter & Griswold LLP

(57) ABSTRACT

Disclosed is a touch substrate, including a base substrate; a plurality of first touch electrodes and a plurality of second touch electrodes arranged on the base substrate, wherein the plurality of first touch electrodes and the plurality of second touch electrodes have an overlapping area and are electrically insulated from each other; and a plurality of touch units arranged on the base substrate. Each of the touch units
(Continued)

includes at least two first touch electrodes and at least one second touch electrode, and the at least two first touch electrodes in each touch unit are connected in parallel. By arranging at least two first touch electrodes connected with each other in parallel in each touch unit, the channel resistance is reduced effectively, and a large-sized touch product is realized. A method of fabricating a touch substrate, a display panel, and a display device are further disclosed.

19 Claims, 6 Drawing Sheets

(56) References Cited

U.S. PATENT DOCUMENTS

| | | | |
|---|---|---|---|
| 2010/0026661 A1* | 2/2010 | Teramoto | G06F 3/044 345/174 |
| 2010/0108409 A1 | 5/2010 | Tanaka et al. | |
| 2010/0164889 A1* | 7/2010 | Hristov | G06F 3/0416 345/173 |
| 2010/0302201 A1* | 12/2010 | Ritter | G06F 3/044 345/174 |
| 2013/0063371 A1* | 3/2013 | Lee | G06F 3/044 345/173 |
| 2013/0207923 A1* | 8/2013 | Mohindra | G06F 3/044 345/174 |
| 2014/0043288 A1* | 2/2014 | Kurasawa | G06F 3/0412 345/174 |
| 2014/0043292 A1 | 2/2014 | Hashimoto | |
| 2014/0049271 A1* | 2/2014 | Trend | G01R 27/2605 324/663 |
| 2015/0077387 A1* | 3/2015 | Han | G06F 3/044 345/174 |
| 2015/0077650 A1 | 3/2015 | Huang et al. | |
| 2015/0109245 A1* | 4/2015 | Chou | G06F 3/044 345/174 |
| 2015/0109248 A1* | 4/2015 | Tokai | G06F 3/044 345/174 |
| 2015/0177888 A1* | 6/2015 | Hashimoto | G06F 3/0418 345/174 |
| 2016/0179259 A1* | 6/2016 | Watanabe | G06F 3/044 345/174 |
| 2016/0209952 A1* | 7/2016 | Lin | G06F 3/044 |
| 2016/0216811 A1 | 7/2016 | Yang | |
| 2016/0224155 A1* | 8/2016 | Kim | G06F 3/044 |
| 2017/0228069 A1 | 8/2017 | Xie et al. | |
| 2017/0262104 A1* | 9/2017 | Huang | G06F 3/0412 |
| 2017/0277325 A1 | 9/2017 | Xie et al. | |
| 2018/0046291 A1 | 2/2018 | Qu | |

FOREIGN PATENT DOCUMENTS

| | | |
|---|---|---|
| CN | 201993737 U | 9/2011 |
| CN | 103472951 A | 12/2013 |
| CN | 105045433 A | 11/2015 |
| CN | 105138198 A | 12/2015 |
| CN | 105446570 A | 3/2016 |
| CN | 205068345 U | 3/2016 |

OTHER PUBLICATIONS

First Office Action from Chinese Patent Application No. 201610660049.9 dated Feb. 27, 2019.
Second Office Action for Chinese Patent Application Serial No. 201610660049.9 dated Sep. 10, 2019.

* cited by examiner

TOUCH SUBSTRATE, FABRICATING METHOD THEREOF, DISPLAY PANEL AND DISPLAY DEVICE

RELATED APPLICATIONS

The present application is the U.S. national phase entry of PCT/CN2017/073543, with an international filing date of Feb. 15, 2017, which claims the benefit of Chinese Patent Application 201610660049.9, filed on Aug. 12, 2016, the entire disclosures of which are incorporated herein by reference.

TECHNICAL FIELD

This disclosure relates to the field of display technology, and particularly to a touch substrate, a fabricating method thereof, a display panel, and a display device.

BACKGROUND

With the development of society and network, touch technology has become more widely used. The current touch solution has been popularized on small and medium-sized touch products such as mobile phones, tablet and laptop computers. Large-sized touch products are rarely seen on the market, because the mainstream mutual capacitance touch solution has high requirements on the resistance. Too large single channel resistance in the touch product will result in insensitive touch, long response time, serious streaking, and poor user experience. Due to these difficulties, touch technology has not been completely introduced into large-sized products yet.

SUMMARY

Embodiments of this disclosure aim to provide an improved touch substrate and a fabricating method thereof, a display panel, and a display device.

In an embodiment of this disclosure, a touch substrate is provided. The touch substrate comprises a base substrate; a plurality of first touch electrodes and a plurality of second touch electrodes arranged on the base substrate, wherein the plurality of first touch electrodes and the plurality of second touch electrodes have an overlapping area and are electrically insulated from each other; and a plurality of touch units arranged on the base substrate. Each of the touch units comprises at least two first touch electrodes and at least one second touch electrode, and the at least two first touch electrodes in each touch unit are connected in parallel.

In the touch substrate of this embodiment, each of the touch units comprises at least two first touch electrodes that are connected with each other in parallel, so that the channel resistance is reduced effectively and the large-sized touch product is realized.

In the touch substrate of this embodiment, each of the touch units comprises at least two touch sub-units. The touch area of a finger is generally 5 mm*5 mm, while the nib area of the touch pen is generally 1 mm*1 mm-3 mm*3 mm. The size of the touch pattern in a conventional touch substrate is about 5 mm*5 mm, so that the capacitance change caused by the nib of the touch pen pressing on the touch substrate is very small, which is difficult to identify. In the touch substrate of this embodiment, since each of the touch units comprises at least two touch sub-units, it is equivalent to reduce the size of each touch unit, which improves the touch sensitivity, thereby reducing the touch blind area so as to support active and passive pens.

In an embodiment of this disclosure, each of the touch units comprises at least two second touch electrodes, and the at least two second touch electrodes in each of the touch units are connected in parallel.

In the touch substrate of this embodiment, each of the touch units comprises at least two first touch electrodes connected with each other in parallel and at least two second touch electrodes connected with each other in parallel, so that the resistances of two channels in each touch unit are both reduced effectively, which is more beneficial for realizing large-sized touch products. In addition, each of the touch units comprises four or more touch sub-units, and this enables to further improve the touch sensitivity of the touch substrate, so as to further reduce the touch blind area.

In an embodiment of this disclosure, each of the touch units comprises first touch electrodes and second touch electrodes of a same number. For example, each of the touch units comprises two of the first touch electrodes connected with each other in parallel and two of the second touch electrodes connected with each other in parallel, so as to form four touch sub-units.

In an embodiment of this disclosure, the plurality of first touch electrodes are arranged in a layer different from the plurality of second touch electrodes, and the plurality of first touch electrodes are electrically insulated from the second touch electrodes by a first insulating layer.

In the touch substrate of this embodiment, the plurality of first touch electrodes are arranged in a first layer. The first insulating layer is arranged above the first layer, and the plurality of the second touch electrodes are arranged in a second layer above the first insulating layer, thereby being electrically insulated from the plurality of first touch electrodes. In an exemplary embodiment, the first touch electrodes and the second touch electrodes have a strip shape.

In an embodiment of this disclosure, the plurality of first touch electrodes and the plurality of second touch electrodes are arranged in a same layer. Each of the first touch electrodes comprises a plurality of first touch sub-electrodes. The plurality of first touch sub-electrodes are disconnected in the overlapping area, and two adjacent first touch sub-electrodes are electrically connected with each other by a first conductive bridge. The first conductive bridge is arranged in the overlapping area and is electrically insulated from the second touch electrodes by a second insulating layer.

In the touch substrate of this embodiment, two adjacent first touch sub-electrodes of the first touch electrodes are electrically connected with each other by the first conductive bridge, thus forming bridge-type first touch electrodes, and correspondingly forming a bridge-type touch substrate. The expression "the first touch sub-electrodes and the second touch electrodes are arranged in a same layer" as used herein means that the first touch sub-electrodes and the second touch electrodes are formed by a same film layer, and that they are in the same layer in the stacking relationship, but does not represent that they must have a same distance from the base substrate. This facilitates simplifying the processes of the first touch sub-electrodes and the second touch electrodes. Exemplarily, the first touch sub-electrodes and the second touch electrodes are formed by a same film forming process and a same patterning process.

In an embodiment of this disclosure, each of the second touch electrodes comprises a plurality of second touch sub-electrodes. The plurality of second touch sub-electrodes are disconnected in the overlapping area, and two adjacent second touch sub-electrodes are electrically connected with each other by a second conductive bridge. The second conductive bridge is arranged in the overlapping area and is electrically insulated from the first touch electrodes.

In the touch substrate of this embodiment, two adjacent first touch sub-electrodes of the first touch electrodes are electrically connected with each other by the first conductive bridge, thus forming bridge-type first touch electrodes, and two adjacent second touch sub-electrodes of the second touch electrodes are electrically connected with each other by the second conductive bridge, thus forming bridge-type second touch electrodes.

In an embodiment of this disclosure, the projections of the first touch electrodes and the second touch electrodes on the base substrate have irregular contours.

In the touch substrate of this embodiment, the first touch electrodes and the second touch electrodes have irregular contours. In the conventional touch substrate, the first touch electrodes and/or the second touch electrodes have a regular contour such as a flat edge, so that there are chromatic aberration and refractive index difference between the area with the touch electrodes and the area without the touch electrodes, thus rendering the etching mark of the touch electrodes visible. To this end, a shadow eliminating layer is generally formed to inhibit the problem of visibility of the etching mark of the touch electrodes. However, the shadow eliminating layer causes an increase in the fabricating cost of the touch substrate. By comparison, the first touch electrodes and the second touch electrodes in this embodiment have irregular contours, so that reflection angles of light at the edge curves of the first touch electrodes and the second touch electrodes are different. This enables the human eyes to be insensitive to the edge curve of the first touch electrodes and the second touch electrodes, thus improving the shadow eliminating effect of the touch substrate.

In an embodiment of this disclosure, the touch substrate further comprises a floating electrode, which is arranged in an area outside the first touch electrodes and the second touch electrodes in each of the touch units, and which is electrically insulated from the first touch electrodes and the second touch electrodes.

In the touch substrate of these embodiments, the floating electrode is floated in the touch phase, i.e., not applied with any electric signal. The floating electrode in the floating state shields the electric signal interference between the first touch electrodes or between the second touch electrodes, thus improving touch sensitivity of the touch substrate.

In an embodiment of this disclosure, the floating electrode is arranged in a same layer as the first touch electrodes or the second touch electrodes.

In the touch substrate of this embodiment, the floating electrode and the first touch electrodes are arranged in the same layer. This facilitates simplifying the process of the floating electrode and the first touch electrodes. Exemplarily, the floating electrode and the first touch electrodes are formed by a same film forming process and a same patterning process. In other embodiments, the floating electrode and the second touch electrodes are arranged in the same layer.

In an embodiment of this disclosure, the projection of the floating electrode on the base substrate has an irregular contour.

In the touch substrate of this embodiment, the floating electrode introduces additional irregular contours, which further improves the shadow eliminating effect of the touch substrate. In an exemplary embodiment, a conductive layer is formed by a same film forming process, and a groove is formed between the floating electrode and the first and second touch electrodes by a same patterning process, thus forming the floating electrode and the first and second touch electrodes. This facilitates simplifying the fabricating process of the floating electrode and the first and second touch electrodes.

In an embodiment of this disclosure, the floating electrode comprises at least two floating sub-electrodes. The projection of each of the floating sub-electrodes on the base substrate has an irregular contour.

In the touch substrate of this embodiment, each floating sub-electrode of the floating electrode has an irregular contour, so that the touch substrate has a mussy visual impression. This thereby avoids regular reflection of light, and thus improves the shadow eliminating effect of the touch substrate. The groove between adjacent floating sub-electrodes is formed by a same patterning process, so as to form the floating sub-electrodes, thus simplifying the fabricating process.

In an embodiment of this disclosure, the at least two first touch electrodes in each of the touch units are connected with each other in parallel by a wiring in an peripheral area of the touch substrate.

In the touch substrate of this embodiment, the wiring is arranged in the peripheral area of the touch substrate, which does not occupy the touch unit of the touch substrate, thus ensuring the effective area of each touch unit.

In an embodiment of this disclosure, the first touch electrodes and the second touch electrodes comprise a transparent conductive material.

In the touch substrate of this embodiment, the first touch electrodes and the second touch electrodes comprise a transparent conductive material, e.g., metal, metal alloy, metal oxide, carbon nano-tube and graphene. In addition, the material of the first insulating layer and the second insulating layer is a transparent insulating material, e.g., an inorganic insulating material of $SiO_2$, $SiN_x$, $SIO_xN_y$, or an organic insulating material of resin.

An embodiment of this disclosure provides a display panel, which comprises the touch substrate stated above, and a plurality of pixel units corresponding to the plurality of touch units respectively.

The display panel of this embodiment has the same or similar benefits as the embodiments of the touch substrate stated above, which will not be repeated here.

The expression "each of the pixel units corresponds to each of the touch units respectively" as used herein means that the projections of each pixel unit and each touch unit on the base substrate coincide with each other. However, it is understood that the case in which the projections of each pixel unit and each touch unit on the base substrate are offset from each other is also feasible.

In an embodiment of this disclosure, the wiring is arranged in the same layer as the source and the drain of the thin film transistor in the touch substrate, or is arranged in the same layer as the gate of the thin film transistor.

In the touch substrate of this embodiment, the wiring is arranged in the same layer as the source and the drain of the thin film transistor, or is arranged in the same layer as the gate. This facilitates simplifying the forming process of the wiring. Exemplarily, the wiring and the gate are formed by a same film forming process and a same patterning process. In other embodiments, the wiring is arranged in the same layer as the source and the drain.

An embodiment of this disclosure provides a display device, comprising the display panel as stated above.

The display device of this embodiment has the same or similar benefits as the embodiments of the touch substrate as stated above, which will not be repeated here.

An embodiment of this disclosure provides a method for fabricating a touch substrate, comprising steps of: preparing a base substrate; and forming a plurality of touch units on the base substrate, wherein each of the touch units comprises at least two first touch electrodes and at least one second touch electrodes which have an overlapping area and are electrically insulated from each other, and the at least two first touch electrodes in each of the touch units are connected in parallel.

In an embodiment of this disclosure, each of the touch units comprises at least two second touch electrodes, and the at least two second touch electrodes in each of the touch units are connected in parallel.

In an embodiment of this disclosure, each of the touch units comprises first touch electrodes and second touch electrodes of a same number.

In an embodiment of this disclosure, the method further comprises: forming a wiring in a peripheral area of the touch substrate, wherein the wiring connects the at least two first touch electrodes in each of the touch units in parallel.

The method for fabricating the display panel of this embodiment has the same or similar benefits as the embodiments of the touch substrate as stated above, which will not be repeated here.

It should be understood that the above general descriptions and the following detailed descriptions are only exemplary and explanatory, rather than aiming to limiting this disclosure in any manner.

BRIEF DESCRIPTION OF THE DRAWINGS

In order to explain the technical solutions in the embodiments of this disclosure more clearly, next, the drawings to be used for describing the embodiments will be introduced briefly. Apparently, the drawings described below are only some embodiments of this disclosure.

Figure 1A:
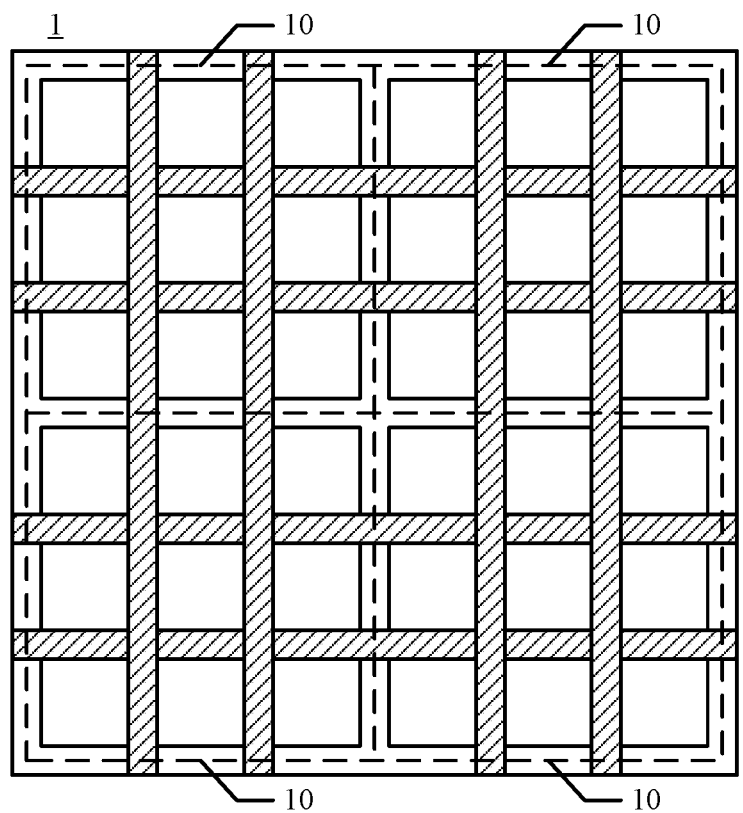
FIG. 1A is a schematic top view of a touch substrate according to an embodiment of this disclosure.

By means of the above drawings, the explicit embodiments of this disclosure have been shown, which will be described in more details later in this text. These drawings and literal descriptions aim to explaining the concept of this disclosure for an ordinary skilled person in the art by making reference to the particular embodiments rather than limiting the scope of the concept of this disclosure in any way.

DETAILED DESCRIPTION OF EMBODIMENTS

In order to make the objects, solutions and advantages of embodiments of this disclosure more clear, technical solutions of embodiments of this disclosure will be described hereinafter in more details with reference to the accompanying drawings.

Components or elements in the drawings are labeled as follows. 1, 3 touch substrate; 10, 20, 30, 40 touch unit; 100, 300 base substrate; 110, 210, 310, 410 first touch electrode; 120, 220, 320, 420 second touch electrode; 130 first insulating layer; 250, 450 floating electrode; 251, 252, 451, 452, 453 floating sub-electrode; 315, 415 first touch sub-electrode; 330 second insulating layer; 340 first conductive bridge; 5 display device; 50 display panel; 51 pixel unit; 52 protection layer.

Specific implementations of the touch substrate and the fabricating method thereof, the display panel and the display device according to embodiments of this disclosure will be explained hereinafter with reference to the drawings.

Figure 1B:
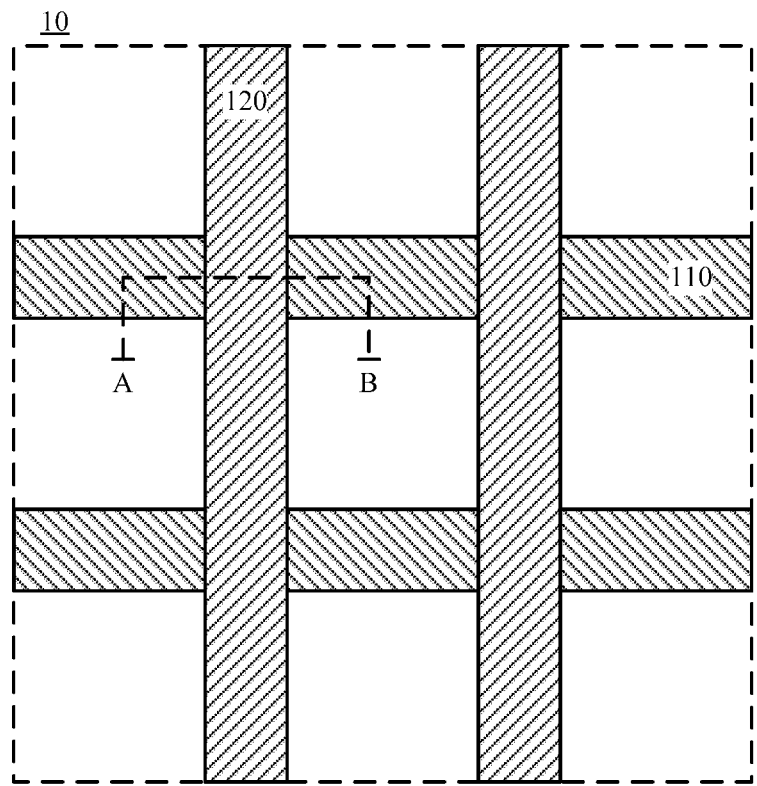
FIG. 1B is a schematic top view of a touch unit in the touch substrate according to an embodiment of this disclosure.
Figure 1C:
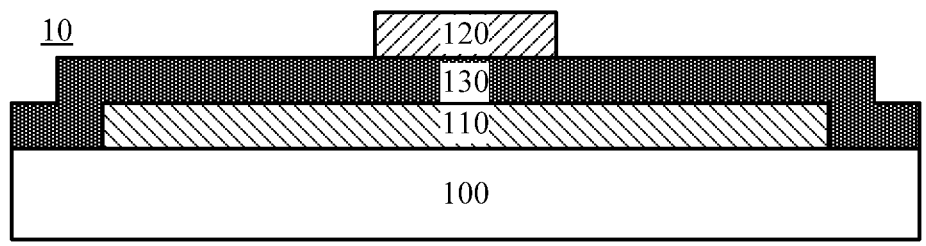
FIG. 1C is a schematic sectional view of the touch substrate according to an embodiment of this disclosure along line A-B in FIG. 1B.

In an embodiment of this disclosure, a touch substrate 1 is provided. As shown in FIG. 1A, the touch substrate 1 comprises a plurality of touch units 10 which are arranged in a repeated manner. FIG. 1B and FIG. 1C schematically show a touch unit 10 in the touch substrate 1. As shown in FIGS. 1B and 1C, the touch unit 10 comprises first touch electrodes 110 arranged on a base substrate 100, a first insulating layer 130 covering the first touch electrodes 110, and second touch electrodes 120 arranged on the first insulating layer 130. The first touch electrodes 110 and the second touch electrodes 120 intersect with each other and are electrically insulated from each other by the first insulating layer 130 in the overlapping area. The base substrate 100 is generally transparent, for example, glass or transparent resin.

In an exemplary embodiment, as shown in FIG. 1B, each touch unit 10 comprises two first touch electrodes 110 connected with each other in parallel. In other embodiments, each touch unit 10 comprises first touch electrodes 110 of a larger number which are connected with each other in parallel, for example, three or more first touch electrodes 110. When each touch unit 10 comprises at least two first touch electrodes 110 connected with each other in parallel, the equivalent resistance of these first touch electrodes 110 which are connected in parallel is reduced, and the channel resistance in a first direction (i.e., the direction of the first touch electrodes 110) is reduced effectively. In such a case, the channel resistance of the touch substrate 1 in the first direction is reduced. Correspondingly, the touch in the first direction is sensitive and the response time is shortened, thereby mitigating or eliminating the phenomenon of streaking, and improving the user experience. Hence, the touch substrate 1 in this embodiment facilitates realizing large-sized touch products. That is, by arranging at least two first touch electrodes 110 and one second touch electrode 120 connected in parallel in each touch unit 10, the channel resistance of the touch substrate 1 in the direction of the first touch electrodes 110 is reduced, thereby improving touch sensitivity in this direction.

In an exemplary embodiment, as shown in FIG. 1B, each touch unit 10 further comprises two second touch electrodes 120 connected with each other in parallel. In other embodiments, each touch unit 10 comprises second touch electrodes 120 of a larger number which are connected with each other in parallel, for example, three or more second touch electrodes 120. The equivalent resistance of these second touch electrodes 120 which are connected in parallel is reduced, and the channel resistance in a second direction (i.e., the direction of the second touch electrodes 120) is reduced effectively. In such a case, the channel resistance of the touch substrate 1 in the second direction is also reduced. Correspondingly, the touch in the first direction and the second direction is sensitive and the response time is shortened, thereby mitigating or eliminating the phenomenon of streaking, and improving the user experience. Hence, the touch substrate 1 in this embodiment is more beneficial for realizing large-sized touch products.

As an example, in the touch substrate 1 as shown in FIG. 1B, each touch unit 10 comprises two first touch electrodes 110 connected with each other in parallel and two second touch electrodes 120 connected with each other in parallel. In such a case, each touch unit 10 comprises four touch sub-units. It is equivalent to reduce the size of each touch unit 10, which improves the touch sensitivity, thereby reducing the touch blind area so as to support active and passive pens.

Theoretically, the larger the number of the first touch electrodes 110 (or the second touch electrodes 120) connected with each other in parallel in each touch unit 10 is, the lower the channel resistance of the touch substrate 1 in the first direction (or the second direction) will be, and the higher the touch sensitivity will be correspondingly, however, the higher the power consumption of the driving circuit will be. Hence, if the power consumption of the driving IC were not considered, by setting the number of the first touch electrodes 110 and the second touch electrodes 120 in each touch unit 10, the channel resistance in the first direction and the second direction is adjusted, and thus the touch sensitivity is adjusted correspondingly.

In order to show the first touch electrodes 110 and the second touch electrodes 120 clearly, the first insulating layer 130 is not shown in FIG. 1B. In other embodiments, the touch substrate 1 further comprises a protection layer (not shown). The protection layer covers the metal touch electrodes (e.g., the second touch electrodes 120 in FIG. 1C) so as to prevent them from being oxidized which may reduce conductivity.

In FIGS. 1A and 1B, the first touch electrodes 110 and the second touch electrodes 120 have a strip shape and are perpendicular to each other. The ordinary skilled person in the art should understand that the first touch electrodes 110 and the second touch electrodes 120 may have other shapes, and may be arranged to intersect with each other in a manner of being not perpendicular to each other.

In an exemplary embodiment, at least two first touch electrodes 110 in each touch unit 10 are connected with each other in parallel by a wiring (not shown) in a peripheral area of the touch substrate 1. By arranging the wiring in the peripheral area of the touch substrate 1, the area of the touch unit 10 of the touch substrate 1 will not be occupied, thus ensuring the effective area of each touch unit 10.

In an exemplary embodiment, the first touch electrodes 110 and the second touch electrodes 120 comprise a transparent conductive material, and the first insulating layer 130 comprises a transparent insulating material. In an exemplary embodiment, the material of the first touch electrodes 110 and the second touch electrodes 120 is a metal, metal alloy, metal oxide, carbon nanotube or graphene. In an exemplary embodiment, the material of the first touch electrodes 110 and the second touch electrodes 120 is a conductive metal oxide like ITO, IZO, and IGZO. The light transmittance of these conductive metal oxides is superior over the metal or the metal alloy, thereby helping to improve the light transmittance and shadow eliminating effect of the touch substrate. In an exemplary embodiment, the material of the first insulating layer 130 is an inorganic insulating material of $SiO_2$, $SiN_x$, $SiO_xN_y$, or an organic insulating material e.g. resin.

Figure 2A:
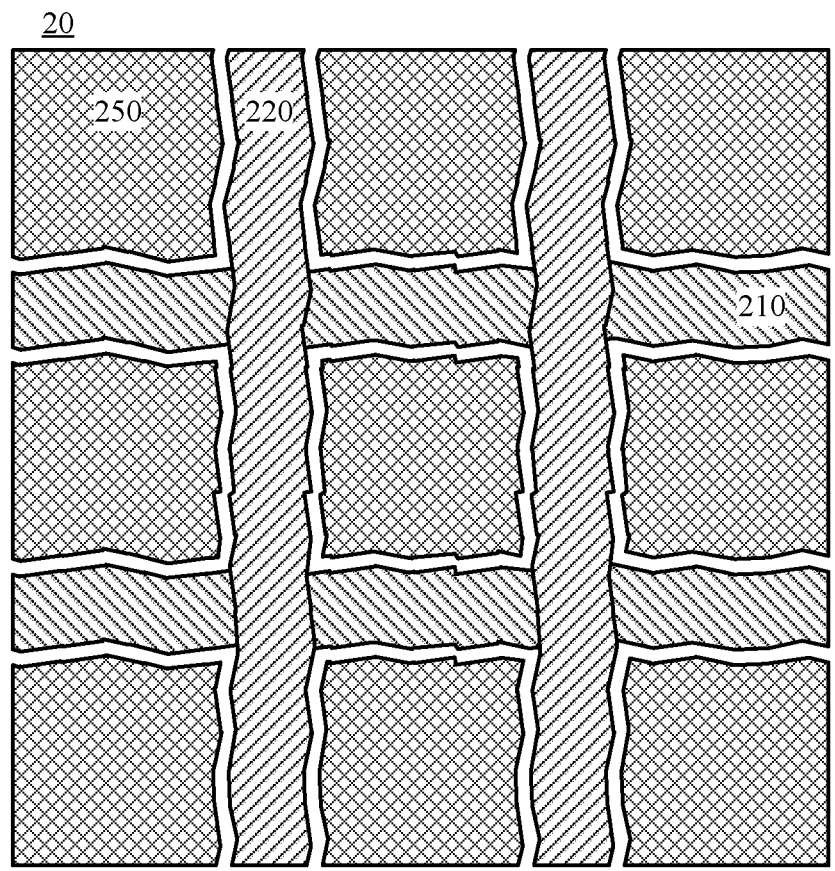
FIG. 2A is a schematic top view of a touch unit in the touch substrate according to an embodiment of this disclosure.

FIG. 2A schematically shows a touch unit 20 in a touch substrate according to an embodiment. As shown in FIG. 2A, each touch unit 20 comprises two first touch electrodes 210 connected with each other in parallel and two second touch electrodes 220 connected with each other in parallel. It differs from the embodiment of FIG. 1B in that the projection of the first touch electrodes 210 on the base substrate has an irregular contour. That is, although the first touch electrodes 210 are still in a strip shape on the whole, it has irregular edge curves. In an exemplary embodiment, the projection of the second touch electrodes 220 on the base substrate also has an irregular contour.

When the first touch electrodes and/or the second touch electrodes have a regular contour such as a flat edge (as shown in FIG. 1B), there are chromatic aberration and refractive index difference between the area with the touch electrodes and the area without the touch electrodes, thus rendering the etching mark of the touch electrodes visible. In contrast, since the first touch electrodes 210 and the second touch electrodes 220 have irregular contours, the reflection angles of light at the edge curves of the first touch electrodes 210 and the second touch electrodes 220 are different. This enables the human eyes to be insensitive to the edge curve of the first touch electrodes 210 and the second touch electrodes 220, thus improving the shadow eliminating effect of the touch substrate. Because an additional shadow eliminating layer is not required to enable the etching mark invisible, the fabricating cost of the touch substrate is reduced.

In an exemplary embodiment, a floating electrode is arranged in an area outside the first touch electrodes and the second touch electrodes in each touch unit. As shown in FIG. 2A, a floating electrode 250 is arranged in an area outside the first touch electrodes 210 and the second touch electrodes 220 in the touch unit 20. For example, the floating electrode 250 is arranged in an area between the first touch electrodes 210 and is electrically insulated from the first touch electrodes 210. In the touch phase, the floating electrode 250 is floated, i.e., being not applied with any electric signal. The floating electrode 250 in the floating state shields the electric signal interference between the first touch electrodes 210, which facilitates improving the touch sensitivity of the touch substrate.

In an exemplary embodiment, the floating electrode 250 and the first touch electrodes 210 are arranged in a same layer, which facilitates simplifying the forming process of the floating electrode. For example, the floating electrode 250 and the first touch electrodes 210 are formed by a same film forming process and a same patterning process.

As shown in FIG. 2A, the projection of the floating electrode 250 on the base substrate has an irregular contour, which further improves the shadow eliminating effect of the touch substrate.

Figure 2B:
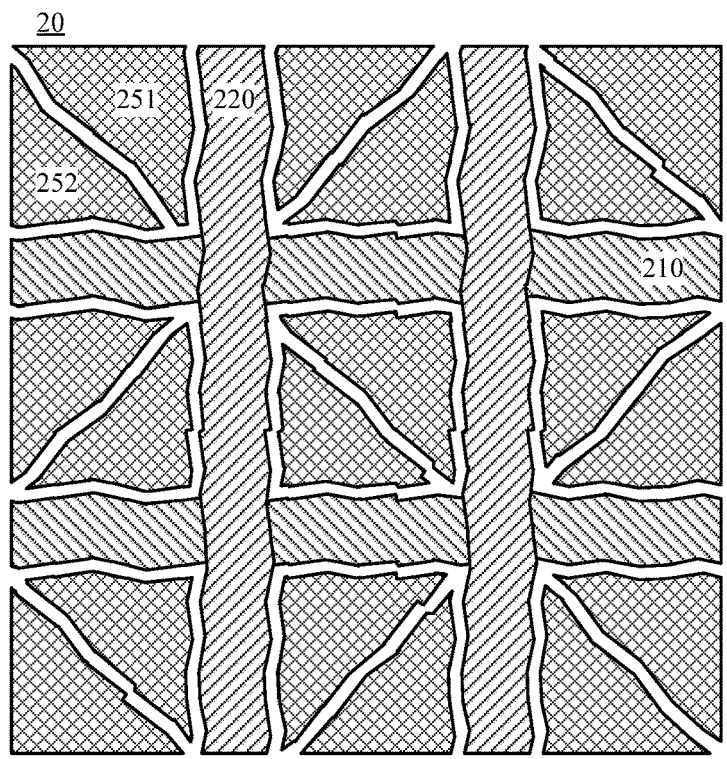
FIG. 2B is a schematic top view of a touch unit in the touch substrate according to an embodiment of this disclosure.

FIG. 2B schematically shows a touch unit 20 in a touch substrate according to an embodiment. It differs from the embodiment of FIG. 2A in that each floating electrode 250 comprises two floating sub-electrodes 251, 252. In an exemplary embodiment, the projection of each of the floating sub-electrodes 251, 252 on the base substrate has an irregular contour. Since each of the floating sub-electrodes 251, 252 of the floating electrode 250 has an irregular contour, the touch substrate has a mussy visual impression, thereby avoiding regular reflection of light. This further improves the shadow eliminating effect of the touch substrate. In an exemplary embodiment, the groove between adjacent floating sub-electrodes is formed by a same patterning process, so as to form the floating sub-electrodes.

In the embodiment of FIG. 2B, each floating electrode comprises two floating sub-electrodes. The groove between the two floating sub-electrodes is along the diagonal direction of the floating electrode, and the floating sub-electrode in a floating electrode and the floating sub-electrode in an adjacent floating electrode are in mirror image arrangement. It should be pointed out that each floating electrode can comprise a different number of floating sub-electrodes, or does not comprise a floating sub-electrode. The groove between the floating sub-electrodes can be arranged along other directions. In addition, the floating sub-electrodes of adjacent floating electrodes can also be arranged in other manners, e.g., random arrangement.

Figure 3A:
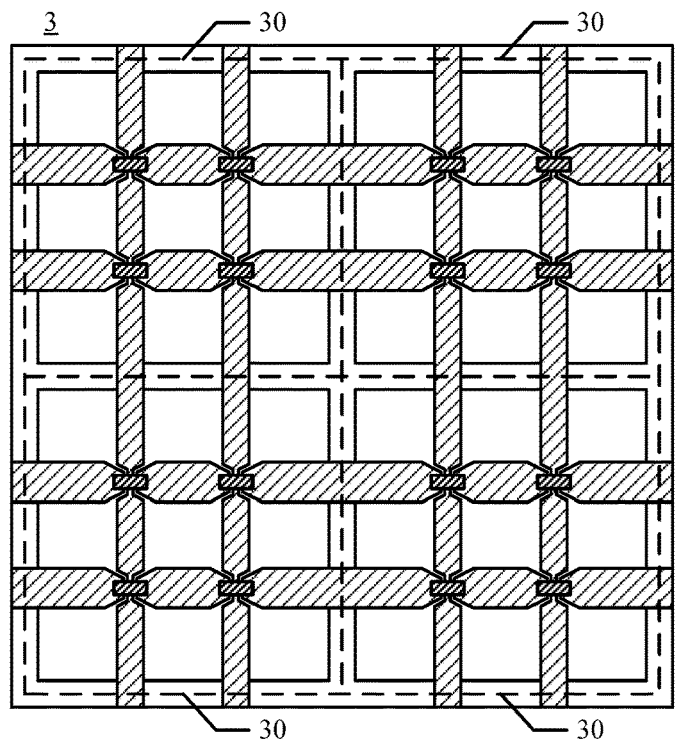
FIG. 3A is a schematic top view of a touch substrate according to an embodiment of this disclosure.
Figure 3B:
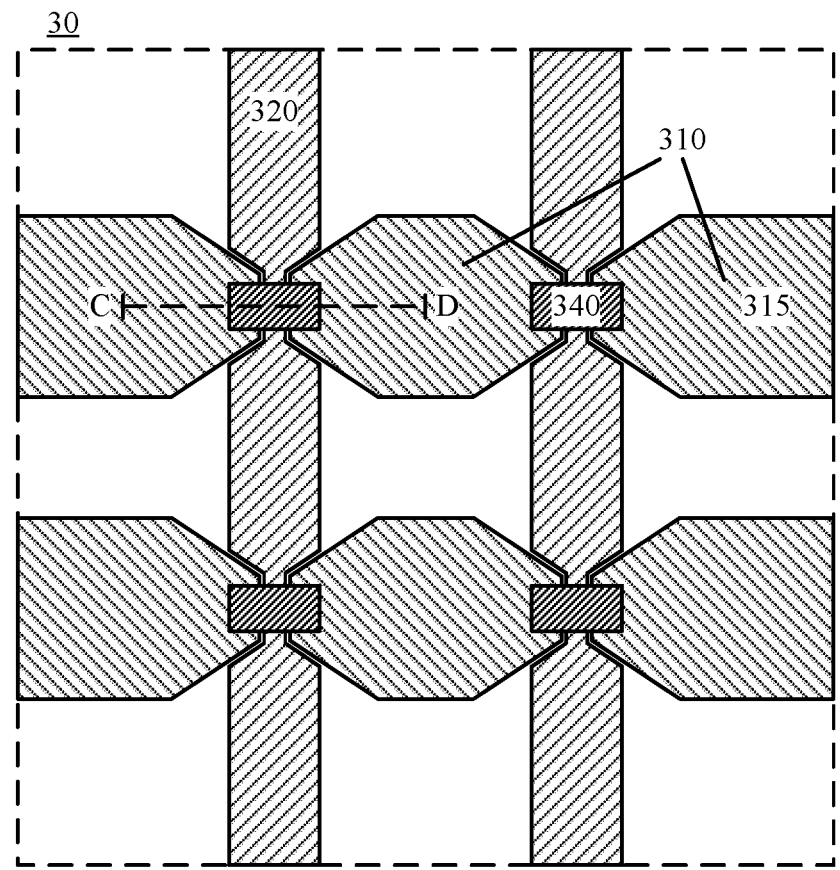
FIG. 3B is a schematic top view of a touch unit in the touch substrate according to an embodiment of this disclosure.
Figure 3C:
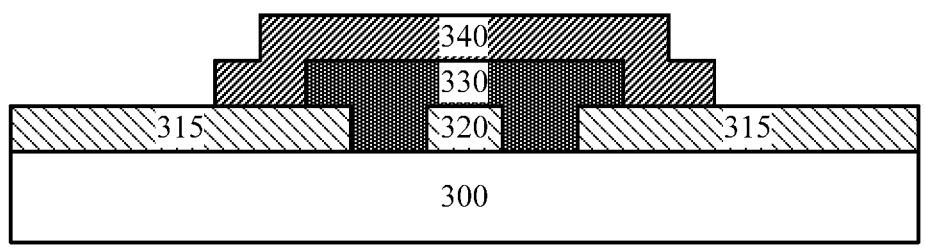
FIG. 3C is a schematic sectional view of the touch substrate according to an embodiment of this disclosure along line C-D in FIG. 3B.

In an embodiment of this disclosure, a touch substrate 3 is provided. As shown in FIG. 3A, the touch substrate 3 comprises a plurality of touch units 30 which are arranged in a repeated manner. FIG. 3B and FIG. 3C schematically show a touch unit 30 in the touch substrate 3. As shown in FIGS. 3B and 3C, each touch unit 30 comprises a base substrate 300 and a second insulating layer 330 arranged on the base substrate 300, two first touch electrodes 310 and two second touch electrodes 320. The first touch electrodes 310 and the second touch electrodes 320 have an overlapping area and are electrically insulated from each other by the second insulating layer 330 in the overlapping area.

As shown in FIG. 3C, each of the first touch electrodes 310 comprises a plurality of first touch sub-electrodes 315 separated from each other. Two adjacent first touch sub-electrodes 315 are electrically connected with each other by a first conductive bridge 340. The first conductive bridge 340 is arranged in the overlapping area and is electrically insulated from the second touch electrodes 320 by the second insulating layer 330. In the touch substrate 3 of this embodiment, two adjacent first touch sub-electrodes 315 of the first touch electrodes 310 are electrically connected with each other by the first conductive bridge, thus forming first touch electrodes 310 of a bridge-type, and correspondingly forming a bridge-type touch substrate 3.

As shown in FIG. 3B and FIG. 3C, the second touch electrodes 320 comprises a continuous conductive portion, and the first touch sub-electrodes 315 and the second touch electrodes 320 are arranged in a same layer.

In an exemplary embodiment, the material of the first conductive bridge is a transparent metal or metal alloy. The conductivity of these metals or metal alloys is superior over that of the metal oxide, thereby helping to reduce the resistance of the first touch electrodes 310 and improving the touch sensitivity of the touch substrate 3.

In an exemplary embodiment, the material of the first conductive bridge is molybdenum, aluminum, molybdenum alloy or aluminum alloy. These metals or metal alloys have excellent stability and are not easy to be oxidized or corroded. In such a case, the first conductive bridge 340 has good stability, which facilitates improving the performance and the lifetime of the touch substrate.

In the embodiment of FIG. 3C, the first touch sub-electrodes 315 and the second touch electrodes 320 are arranged in a same layer on the base substrate 300. The first conductive bridge 340 electrically connects two adjacent first touch sub-electrodes 315 so as to form first touch electrodes 310.

Figure 3D:
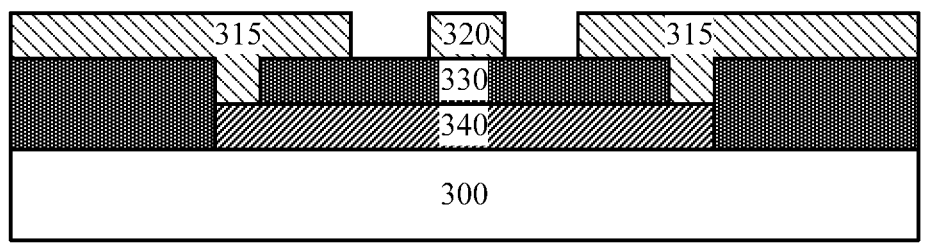
FIG. 3D is a schematic sectional view of a variation of the touch substrate as shown in FIG. 3C.

FIG. 3D shows a variation of the embodiment of FIG. 3C. As shown in FIG. 3D, the first conductive bridge 340 is arranged on the base substrate. The first touch sub-electrodes 315 are electrically connected with the first conductive bridge 340 by a via in the second insulating layer 330, so as to form first touch electrodes 310.

In embodiments shown in FIG. 3B, FIG. 3C and FIG. 3D, two adjacent first touch sub-electrodes 315 are electrically connected with each other by the first conductive bridge 340, thus forming first touch electrodes 310 of a bridge-type. However, the bridge-type touch electrode structure of the touch substrate 3 is not limited to this. For example, in an exemplary embodiment, each of the second touch electrodes also comprises a plurality of second touch sub-electrodes separated from each other, and two adjacent second touch sub-electrodes are electrically connected with each other by a second conductive bridge. The second conductive bridge is arranged in the overlapping area and is electrically insulated from the first touch electrodes. That is to say, the second touch electrodes can also be of a bridge-type.

Figure 4A:
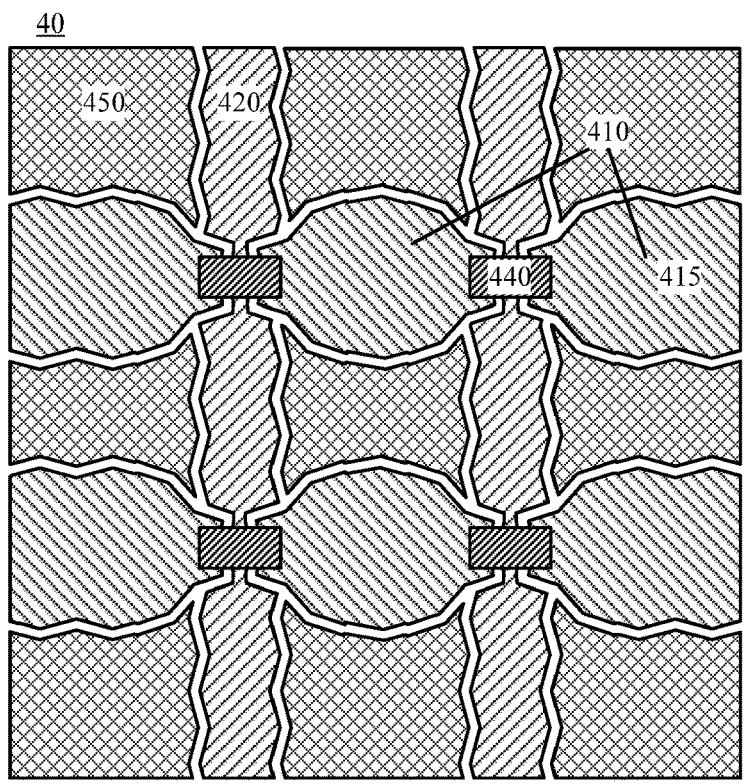
FIG. 4A is a schematic top view of a touch unit in the touch substrate according to an embodiment of this disclosure.

FIG. 4A schematically shows a touch unit 40 in a touch substrate according to an embodiment. As shown in FIG. 4A, each touch unit 40 comprises two first touch electrodes 410 connected with each other in parallel and two second touch electrodes 420 connected with each other in parallel. Each of the first touch electrodes 410 comprises a plurality of first touch sub-electrodes 415 separated from each other. Two adjacent first touch sub-electrodes 415 are electrically connected with each other by a first conductive bridge 440.

Similar as the embodiment of FIG. 2B, the projection of the first touch electrodes 410 on the base substrate has an irregular contour. In an exemplary embodiment, a floating electrode 450 is arranged at an area outside the first touch electrodes 410 and the second touch electrodes 420 in the touch unit 40. In the touch phase, the floating electrode 450 is floated, i.e., being not applied with any electric signal. The floating electrode 450 in the floating state shields the electric signal interference between the first touch electrodes 410 and the second touch electrodes 420, which facilitates improving touch sensitivity of the touch substrate.

In an exemplary embodiment, the floating electrode 450 is arranged in a same layer as the first touch electrodes 410 and the second touch electrodes 420. In an exemplary embodiment, the projection of the floating electrode 450 on the base substrate has an irregular contour, and this further improves the shadow eliminating effect of the touch substrate.

Figure 4B:
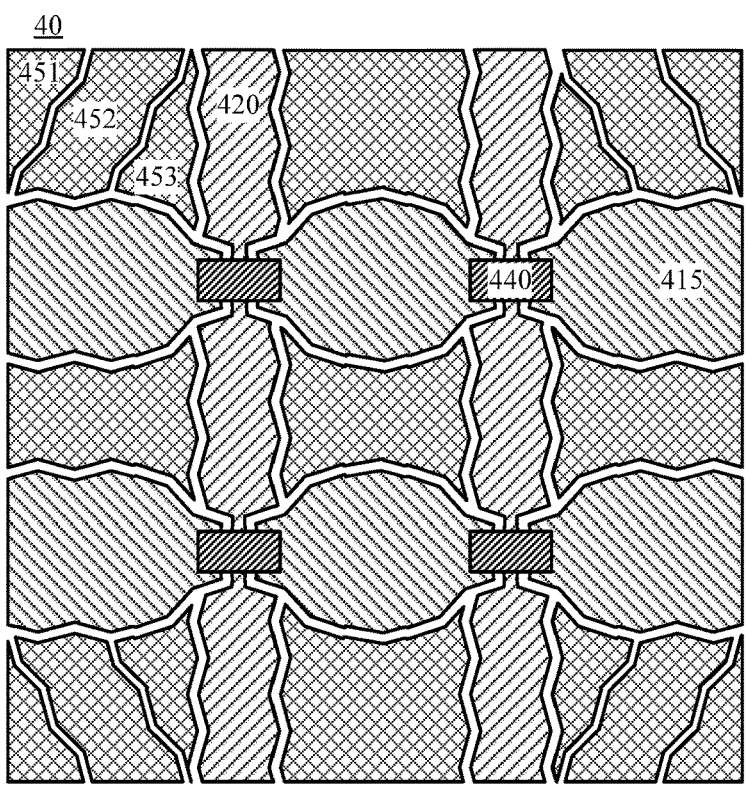
FIG. 4B is a schematic top view of a touch unit in the touch substrate according to an embodiment of this disclosure.

FIG. 4B schematically shows a touch unit 40 in a touch substrate according to an embodiment. It differs from the embodiment of FIG. 4A in that each of the floating electrodes 450 at four corners of the touch unit 40 comprises three floating sub-electrodes 451, 452, 453. In an exemplary embodiment, the projection of each floating sub-electrode 451, 452, 453 has an irregular contour. This further improves the shadow eliminating effect of the touch substrate.

An embodiment of this disclosure further provides a display panel, comprising the touch substrate in the above embodiments, and further comprising a plurality of pixel units. Each of the pixel units corresponds to each of the touch units respectively. The display panel for example is an OGS, On-Cell and In-Cell display panel. Certainly, the display panel in embodiments of this disclosure can also be other types of display panel known by the ordinary skilled person in the art.

In an exemplary embodiment, the wiring for enabling at least two first touch electrodes in each touch unit to be connected in parallel is arranged in a same layer as the source and the drain of the thin film transistor in the display panel. Alternatively, the wiring is arranged in the same layer as the gate of the thin film transistor. In this way, the forming process of the wiring is simplified.

An embodiment of this disclosure further provides a display device, comprising the display panel in the above embodiment.

Figure 5:
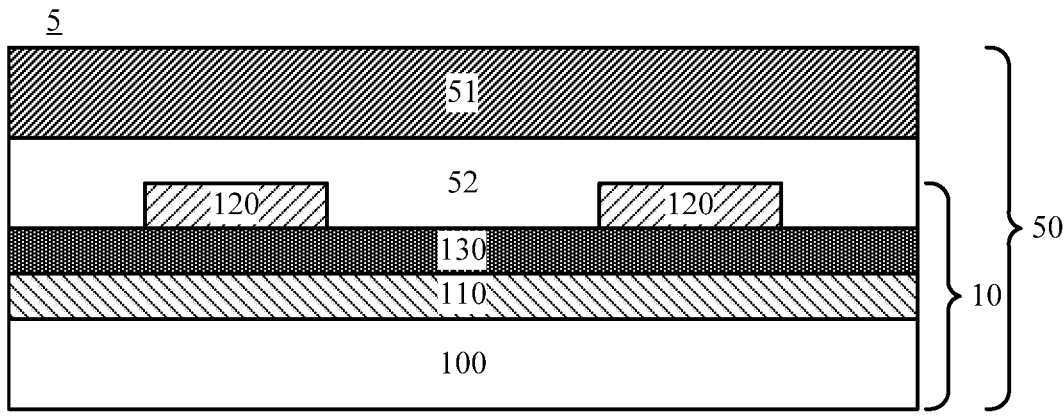
FIG. 5 is a schematic sectional view of a display device according to an embodiment of this disclosure.

FIG. 5 is a schematic sectional view of a display device 5 along the direction of the first touch electrodes 110 in FIG. 1B. For the sake of simplification, FIG. 5 only shows a local part of the display device 5. As shown, the display device 5 comprises a display panel 50. The display panel 50 comprises a touch substrate 10. Reference is made to the corresponding description on FIGS. 1B and 1C regarding the description of the touch unit 10. The display panel 50 further comprises a plurality of pixel units 51 (only one of them is shown in the figure). The pixel unit 51 corresponds to the touch unit 10. In an embodiment, the display panel 50 further comprises a protection layer 52 arranged on a surface of the touch unit 10 so as to cover the second touch electrodes 120.

FIG. 5 describes the display panel and the display device according to embodiments of this disclosure by taking the touch unit as shown in FIGS. 1B and 1C as an example. The ordinary skilled person in the art should understand that the touch unit in the display panel and the display device can be a touch unit described in any of the above embodiments.

The display device in embodiments of this disclosure can be applied in various devices with the display functions, for example, any product or component with the display function such as a mobile phone, a panel computer, a television, a display, a laptop, a digital photo frame, a navigator, electronic paper etc.

Figure 6:
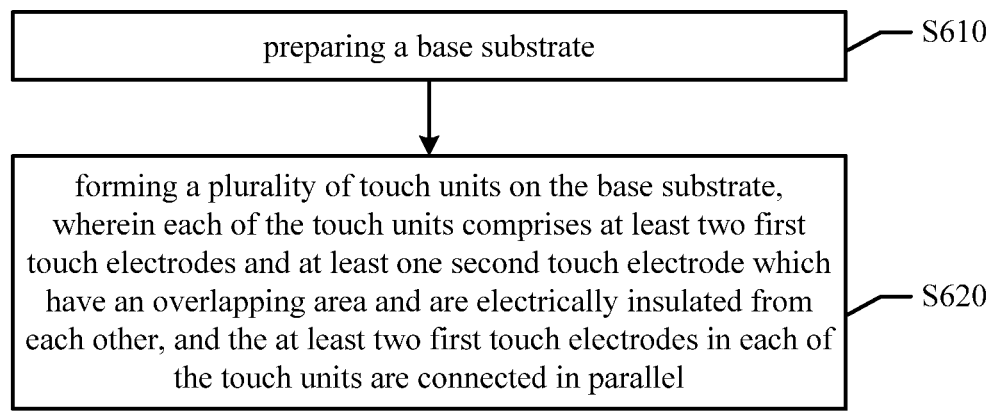
FIG. 6 is a schematic flow chart of a method for fabricating a touch substrate according to an embodiment of this disclosure.

An embodiment of this disclosure provides a method for fabricating a touch substrate. As shown in FIG. 6, the method comprises steps of: S610, preparing a base substrate; and S620, forming a plurality of touch units on the base substrate, wherein each of the touch units comprises at least two first touch electrodes and at least one second touch electrode which have an overlapping area and are electrically insulated from each other, and the at least two first touch electrodes in each of the touch units are connected in parallel.

In an embodiment of this disclosure, each of the touch units comprises at least two second touch electrodes, and the at least two second touch electrodes in each of the touch units are connected in parallel.

In an embodiment of this disclosure, each of the touch units comprises first touch electrodes and second touch electrodes of a same number.

In an embodiment of this disclosure, a wiring is formed in a peripheral area of the touch substrate. The wiring connects the at least two first touch electrodes in each of the touch units in parallel.

The method for fabricating a touch substrate of this embodiment has the same or similar benefits as the embodiments of the touch substrate stated above, which will not be repeated here.

In the following, steps of the method of this embodiment will be described briefly with reference to the touch substrate as shown in FIG. 1A, FIG. 1B and FIG. 1C.

Firstly, a base substrate 100 is prepared.

Secondly, a plurality of touch units 10 are formed on the base substrate 100. For example, a patterned black matrix layer is formed on the base substrate 100 by the patterning process, thus defining an area of the touch unit 10. It should be pointed out that the patterning process includes the process of forming a predetermined pattern using a mask plate, for example, including processes of coating photoresist, exposing, developing, etching, stripping the photoresist etc. However, the patterning process is not limited to this, but can be any other processes that can form the predetermined pattern.

Thirdly, a pattern of the first touch electrodes is formed by the patterning process. In an exemplary embodiment, two first touch electrodes 110 are formed in each touch unit 10 by sputter coating, coating PR glue, exposing, developing, etching, stripping etc.

Fourthly, a first insulating layer 130 such as organic resin is formed by sputtering.

Fifth, a pattern of the second touch electrodes is formed by the patterning process. In an exemplary embodiment, two second touch electrodes 120 are formed in each touch unit 10. The first touch electrodes 110 and the second touch electrodes 120 intersect with each other and are electrically insulated from each other by the first insulating layer 130 in the overlapping area.

Sixth, a wiring is formed in the peripheral area of the touch substrate by the patterning process to electrically connect the first touch electrodes 110 in each touch unit 10 in parallel, and electrically connect the second touch electrodes 120 in each touch unit 10 in parallel, thus completing the fabrication of the touch substrate 1.

Based on the method steps described in the above embodiment, the ordinary skilled person in the art knows that the method steps of the touch substrate as shown by other drawings are similar. Hence, they will not be repeated here.

Embodiments of this disclosure disclose a touch substrate and a fabricating method thereof, a display panel, and a display device. The touch substrate comprises a base substrate; a plurality of first touch electrodes and a plurality of second touch electrodes arranged on the base substrate, wherein the plurality of first touch electrodes and the plurality of second touch electrodes have an overlapping area and are electrically insulated from each other; and a plurality of touch units arranged on the base substrate. Each of the touch units comprises at least two first touch electrodes and at least one second touch electrode, and the at least two first touch electrodes in each touch unit are connected in parallel, thereby reducing the channel resistance effectively, so as to realize large-sized touch products and support active and passive pens.

In the above embodiments and drawings, each of the touch units comprises two first touch electrodes connected with each other in parallel and two second touch electrodes connected with each other in parallel. However, the ordinary skilled person in the art should understand that within the inventive concept of this disclosure, each touch unit can comprise two first touch electrodes connected with each other in parallel and only one second touch electrode, or each touch unit can comprise at least two first touch electrodes connected with each other in parallel and only one second touch electrode. It should be pointed out that the number of the first touch electrodes and the number of the second touch electrodes in each touch unit are not necessarily the same. It should be pointed out that the first touch electrodes and the second touch electrodes of the touch substrate in embodiments of this disclosure are not limited to the patterns as shown in the drawings, and other patterns known by the ordinary skilled person in the art can be used.

Unless otherwise specified, the technical terms or scientific terms used in this disclosure should be general meanings understood by the ordinary skilled person in the art. The words "first", "second" and similar words used in this disclosure do not present any sequence, amount or importance, instead, only for distinguishing different composite parts. Similarly, the similar words such as "one", "a" or "the" do not represent amount limitation either, only representing presence of at least one. The similar words such as "comprise" or "include" means that the element or object before this word covers the element(s) or object(s) as well as equivalence thereof listed after this word, not excluding other elements or objects. The similar words such as "connect" or "connect with" are not limited to physical or mechanical connection, but including electrical connection, either directly or indirectly. The words "upper", "lower", "left", "right" are only used for representing the relative positional relationship. If the absolute position of the described object is changed, the relative positional relationship may also be changed correspondingly. It should be noted that on the premise of not conflicting, the features in the above embodiments can be used in any combinations.

What are stated above are only specific embodiments of this disclosure, however, the protection scope of this disclosure is not limited to this. Any variations or replacements that can be easily conceived by the ordinary skilled person in the art within the technical scope disclosed by this disclosure should be covered within the protection scope of this disclosure. Therefore, the protection scope of this disclosure should be subject to the protection scopes of the claims.

What is claimed is:

1. A touch substrate, comprising:
   a base substrate;
   a plurality of first touch electrodes and a plurality of second touch electrodes arranged on the base substrate, wherein the plurality of first touch electrodes and the plurality of second touch electrodes have an overlapping area and are electrically insulated from each other;
   a plurality of touch units arranged on the base substrate, wherein each of the touch units comprises at least two first touch electrodes and at least one second touch electrode, and the at least two first touch electrodes in each of the touch units are connected in parallel; and
   floating electrodes, which are arranged in each of the touch units in an area outside the first touch electrodes and the second touch electrodes, and electrically insulated from the first touch electrodes and the second touch electrodes,
   wherein each of the floating electrodes at four corners of each of the touch units comprises three floating sub-electrodes which are separated by grooves.

2. The touch substrate according to claim 1, wherein each of the touch units comprises at least two second touch electrodes, and the at least two second touch electrodes in each of the touch units are connected in parallel.

3. The touch substrate according to claim 1, wherein each of the touch units comprises first touch electrodes and second touch electrodes of a same number.

4. The touch substrate according to claim 1, wherein the plurality of first touch electrodes are arranged in a layer different from the plurality of second touch electrodes, and wherein the plurality of first touch electrodes are electrically insulated from the second touch electrodes by a first insulating layer.

5. The touch substrate according to claim 1, wherein each of the first touch electrodes comprises a plurality of first touch sub-electrodes, the plurality of first touch sub-electrodes and the plurality of second touch electrodes are arranged in a same layer, the plurality of first touch sub-electrodes are disconnected in the overlapping area, and two adjacent first touch sub-electrodes are electrically connected with each other by a first conductive bridge; and
   wherein the first conductive bridge is arranged in the overlapping area, and is electrically insulated from the second touch electrodes by a second insulating layer.

6. The touch substrate according to claim 1, wherein each of the second touch electrodes comprises a plurality of second touch sub-electrodes, the plurality of second touch sub-electrodes are disconnected in the overlapping area, and two adjacent second touch sub-electrodes are electrically connected with each other by a second conductive bridge; and
   wherein the second conductive bridge is arranged in the overlapping area, and is electrically insulated from the first touch electrodes.

7. The touch substrate according to claim 1, wherein projections of the first touch electrodes and the second touch electrodes on the base substrate have irregular contours.

8. The touch substrate according to claim 1, wherein each of the floating electrodes is arranged in a same layer as the first touch electrodes or the second touch electrodes.

9. The touch substrate according to claim 1, wherein a projection of each of the floating electrodes on the base substrate has an irregular contour.

10. The touch substrate according to claim 1, wherein a projection of each of the floating sub-electrodes on the base substrate has an irregular contour.

11. The touch substrate according to claim 1, wherein the at least two first touch electrodes in each of the touch units are connected with each other in parallel by a wiring in a peripheral area of the touch substrate.

12. The touch substrate according to claim 1, wherein the first touch electrodes and the second touch electrodes comprise a transparent conductive material.

13. A display panel, comprising the touch substrate according to claim 1, and further comprising a plurality of pixel units, wherein each of the pixel units corresponds to each of the touch units respectively.

14. The display panel according to claim 13, wherein the at least two first touch electrodes in each of the touch units are connected with each other in parallel by a wiring in a peripheral area of the touch substrate, and
   wherein the wiring is arranged in a same layer as a source and a drain of a thin film transistor in the display panel, or is arranged in a same layer as a gate of the thin film transistor.

15. A display device, comprising the display panel according to claim 13.

16. A method of fabricating a touch substrate, comprising steps of:
- preparing a base substrate;
- forming a plurality of touch units on the base substrate, wherein each of the touch units comprises at least two first touch electrodes and at least one second touch electrode which have an overlapping area and are electrically insulated from each other, and the at least two first touch electrodes in each of the touch units are connected in parallel; and
- forming floating electrodes which are arranged in each of the touch units in an area outside the first touch electrodes and the second touch electrodes, and electrically insulated from the first touch electrodes and the second touch electrodes, wherein each of the floating electrodes at four corners of each of the touch units comprises three floating sub-electrodes which are separated by grooves.

17. The method according to claim 16, wherein each of the touch units comprises at least two second touch electrodes, and the at least two second touch electrodes in each of the touch units are connected in parallel.

18. The method according to claim 16, wherein each of the touch units comprises first touch electrodes and second touch electrodes of a same number.

19. The method according to claim 16, further comprising: forming a wiring in a peripheral area of the touch substrate, wherein the wiring connects the at least two first touch electrodes in each of the touch units in parallel.

* * * * *